R. HOHNBACH.
GRAIN SPROUTER.
APPLICATION FILED OCT. 29, 1910.
989,011.
Patented Apr. 11, 1911.
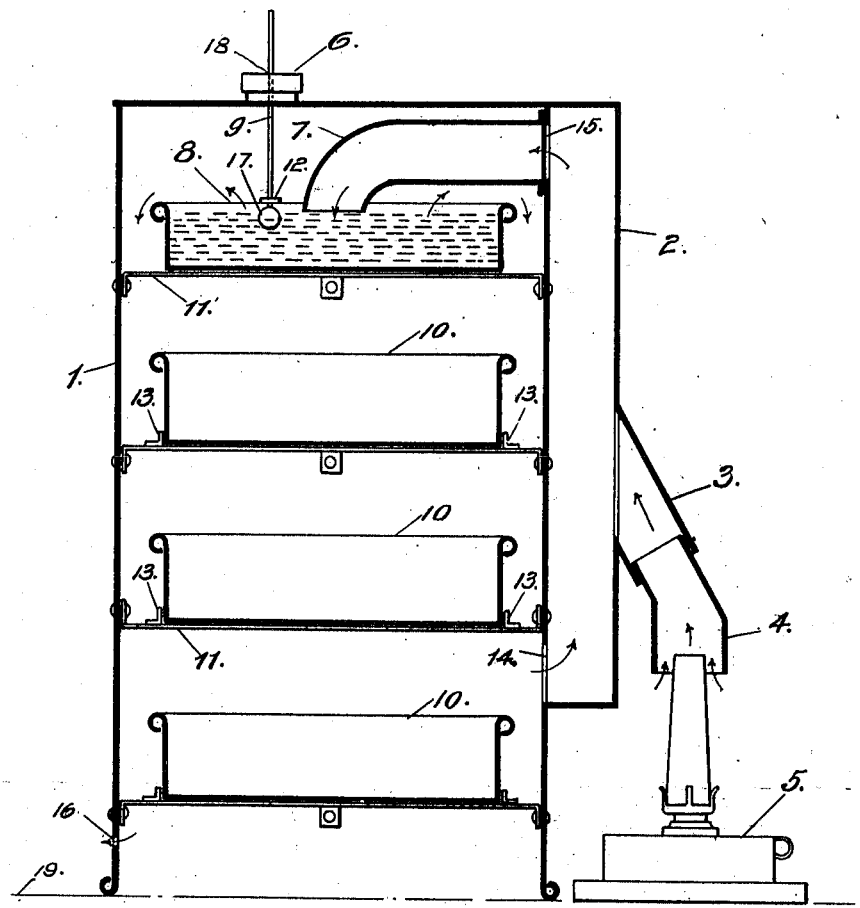
Witnesses
Stephen A. Goodspeed
Bertram A. DeLaury
Inventor
Robert Hohnbach

UNITED STATES PATENT OFFICE.

ROBERT HOHNBACH, OF JOLIET, ILLINOIS.

GRAIN-SPROUTER.

989,011.      Specification of Letters Patent.      Patented Apr. 11, 1911.

Application filed October 29, 1910. Serial No. 590,065.

*To all whom it may concern:*

Be it known that I, ROBERT HOHNBACH, citizen of the United States, residing at Joliet, in the county of Will and State of Illinois, have invented certain new and useful Improvements in Grain-Sprouters, of which the following is a specification.

My invention is a contrivance for sprouting grains or other seeds at any season of the year, and the main object is to enable any one, who so desires, to have on hand freshly sprouted grain at all seasons of the year as food for poultry, and my invention will be valuable to any one desiring sprouted grain or other vegetable seeds, for other purposes.

The method of sprouting is to conduct artificially heated air into an inclosure containing water exposed in a receptacle, and located over other receptacles containing grain or other vegetable seeds exposed, the combination of the contact of different temperatures of air and the exposed water causing humidity and dew-like precipitation on the exposed grain, which with the proper temperature, causes the grain to sprout, as I have clearly demonstrated by experiments. Sprouting in this way avoids the uncleanliness in handling that is caused by other methods of sprouting. The grain or seeds absorbs the moisture and no liquid deposits, stickiness or sloppiness result. These objects are attained by the contrivances illustrated in the accompanying drawing, in which the figure is a sectional elevation of the main part, and, also, of the outer and inner parts, excepting the door, which is not shown.

The casing 1, when in position on a smooth and level floor, and the door to same closed, such door, when closed, forming a part of said casing, is intended to form a practically air-tight chamber; and is preferably made of galvanized iron and preferably cylindrical in form. The flue 2 is securely fastened to the casing 1, and in such a position as to permit the passage of air out of said casing and into said flue 2 through opening 14, and out of said flue 2 and into pipe 7 through the opening 15. The flue 3 opens into flue 2, and flue 4 is slidable in flue 3 so as to adapt its position to the height of any particular lamp, the top of lamp 5 projecting slightly into flue 4, said lamp being used for heating the air to pass into said chamber. The cap 6 is fastened to casing 1 and there is a hole 18 through its center and on down through casing 1, through which indicator 9 is slidable; said indicator having bulb 17 attached to its lower end, and being, also, slidable through guide 12, and is for the purpose of indicating the depth of water in the water-pan 8. The pipe 7 is to receive the heated air from the flue 2 and carry it to the surface of the water in the pan 8. The rests 11—11, secured to the casing 1, are supports for water-pan 8 on the upper rest and for the grain pans 10—10 on the lower rests, the latter centered by the stops 13—13. The number of rests, the size of the water-pan and the number and size of the grain pans depends on the particular size of the grain sprouter. The opening 14, in connection with the suction in flue 2 caused by heated air, is to promote circulation of air. The vent 16 is for the exit of foul air.

Other means than the oil lamp may be substituted for heating air, for instance, a jet with gas connection. The amount of heat needed depends on atmospheric conditions, and at times, artificial heat is not needed.

19 indicates any level surface upon which to place the grain sprouter.

What I claim is—

The grain-sprouter; consisting of, the casing that surrounds the sprouting chamber and fixes its dimensions; the rests in said chamber fastened to said casing; the water-pan and the grain-pans placed upon said rests; the flue 2 so fastened to the said casing that two of its openings coincide with the openings 14 and 15 in said casing; the flue 3 rigidly fastened to, and opening into, the said flue 2; the flue joint 4, slidable in and opening into said flue 3; the pipe 7 with one of its open ends connected to said casing around opening 15; means for producing artificial heat and conducting the same into flue 4 so that a draft will carry heated air into said sprouting chamber and such heated air be released at or near the surface of water in said water-pan, thus producing the essential humidity and temperature for germinating, all substantially as set forth.

In testimony whereof I affix my signature in presence of two witnesses.

ROBERT HOHNBACH.

Witnesses:
   STEPHEN A. GOODSPEED,
   BERTRAM A. DEFANERY.